Figure 1:
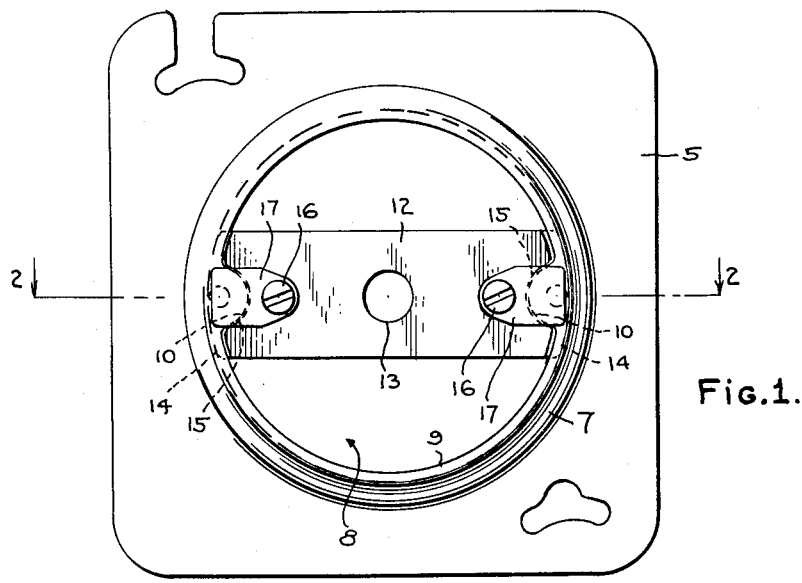

Jan. 12, 1960  Y. KEEN  2,921,114
ELECTRICAL FIXTURE SUPPORT FOR ELECTRICAL OUTLET BOXES
Filed Jan. 20, 1958

INVENTOR.
YEOMAN KEEN,
BY
ATTORNEY

United States Patent Office 2,921,114
Patented Jan. 12, 1960

2,921,114

ELECTRICAL FIXTURE SUPPORT FOR ELECTRICAL OUTLET BOXES

Yeoman Keen, Hollywood, Fla.

Application January 20, 1958, Serial No. 710,092

1 Claim. (Cl. 174—61)

This invention relates to an electrical fixture support for electrical outlet boxes of the type commonly recessed into a wall, ceiling or other areas and whereby to quickly and easily support the electrical fixture from the outlet box with a minimum of effort.

Electrical fixtures heretofore have been difficult to mount to a previously installed outlet box and especially in ceiling boxes and is time consuming and requires considerable effort on the part of the mechanic in supporting the fixture while the electrical connections are made to the wires in the box.

With the present invention, assuming that the fixture is a ceiling fixture, the fixture can be completely assembled on the floor and then connected to the support of this invention after which, the fixture and the support are elevated and engaged with flanges or tongue elements of conventional fixture boxes or cover plates for the boxes at which time, the fixture is firmly supported after which, the mechanic is then able to make his electrical connections without having to additionally support the weight of the fixture. The device readily adapts itself to conventional outlet boxes and requires no alteration to the box or the cover for the box and provides for a much stronger support for the fixture than has heretofore been possible, since the device does not depend upon screws or the like for supporting the weight of the fixture.

The device of the present invention contemplates a supporting plate or bar that is stamped or otherwise formed of a suitable gauge metal and with its opposite ends being offset to form supporting flanges and with the plate at its opposite ends being additionally recessed for the reception of the conventional attaching tabs or tongues normally carried by outlet boxes or the covers for the outlet boxes and whereby the plate may be engaged with flanges of the box or the covers to rest upon either flanges of the box cover to prevent downward movement and with the tongues or tabs seating within the recesses formed in the plate and with additional adjustable tongues being carried by the plate to overlie the tongues or tabs of the boxes.

Other novel features of construction and operation of the device will be more clearly apparent during the course of the following description, reference being had to the accompanying drawings, wherein has been illustrated a preferred form of the device and wherein like characters of reference are employed to denote like parts throughout the several figures.

Figure 2:
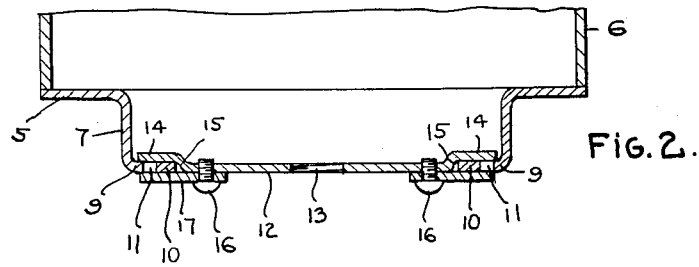
Figures 3, 4:
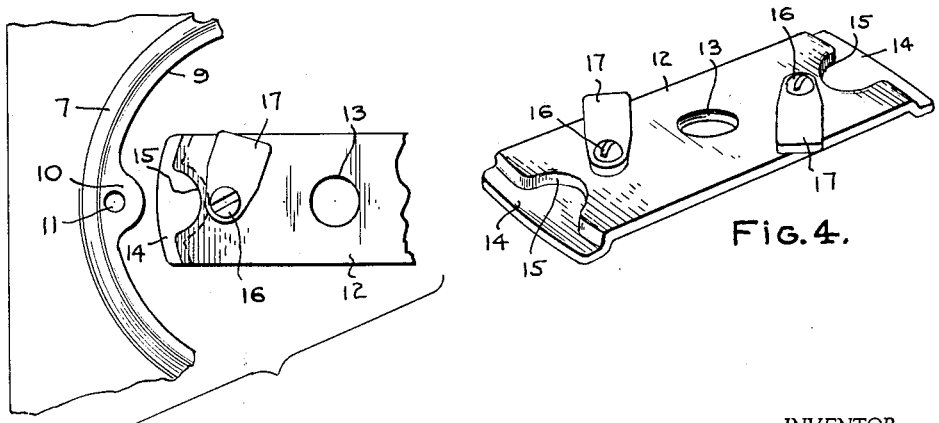

Referring to the drawings:

Figure 1 is a plan view of a cover plate or plaster ring commonly employed in electrical fixture installations and showing the invention applied thereto, Figure 2 is a section taken on line 2—2 of Figure 1, Figure 3 is a fragmentary exploded view illustrating the manner of assembly of the support with respect to the cover plate and, Figure 4 is a perspective view of a fixture support plate embodying the invention.

Referring specifically to the drawings, there has been illustrated for purpose of showing the use of the device with one of numerous types of electrical outlet boxes. The device here illustrated constitutes both a cover plate 5 for a previously installed outlet box 6. The cover plate 5 is of conventional construction and embodies a depending plaster ring or flange 7, forming an opening 8. The flange 7 at its marginal edge is turned inwardly to form a circumferential lip 9. The lip 9 at diametrically opposite points is provided with inwardly extending tongues 10, that are apertured and threaded in the usual manner at 11. While the particular plate 5 and the plaster ring 7 have been employed as one example of a structure for cooperative use of the device of this invention, other forms of boxes, such as rectangular, hexagonal or square, readily receive the device constituting the fixture support, to be described.

The support of the present invention embodies a generally rectangular or elongated flat plate 12 that is apertured and threaded intermediate its ends as at 13. Each end of the plate 12 is downwardly offset to form flanges 14, and with the flanges being arcuate throughout their length, substantially upon the arc of the lip 9. The plate 12 at its opposite ends is further recessed at 15 and with the bottoms of the recesses being co-planar with the upper surface of the flanges 14. The recesses 15 are U-shaped and are spaced from the edges of the plate 12 and are formed by the intermediate portions of the shoulders which connect the offset flanges 14 with the plate 12. The recesses 15 are arcuately formed to conform to and adapted to receive the tongues 10 at assembly of the device. Adjacent to each of the recesses 15, the plate 12 has been tapped and threaded for the reception of binding screws 16, carrying swingable tongues 17. The tongues 17 are flat and have a length adapted to completely overlie the tongues 10 when the device is in assembled relationship to the outlet box. While the aperture 13 has been indicated as being threaded, it will be apparent that the opening may be smooth and any suitable threaded fixture pipe or other bracket may engage therethrough and clamped in any suitable manner by clamping nuts, whereby to rigidly connect the plate 12 with respect to the fixture to be supported.

*Operation*

In the use of the device, employing the type plate 5 here illustrated as an example, the plate 5 may be mounted in the usual manner to the outlet box and rigidly set against movement. The plate 12 is then rigidly connected to the fixture stud or pipe bracket not shown and the mechanic then elevates the fixture and the plate 12 upwardly, engaging it through the opening 8 and then downwardly, causing the flanges 14 to rest upon the lip 9 and with the tongues 10 engaged within the recesses 15. The tongues 17 are then swung over the tongues 10 and the screws 16 firmly set. Thus, the engagement of the flanges 14 with respect to the lip 9 prevents any downward movement of the plate 12 and its supported fixture, while the engagement of the tongues 10 within the recesses 15 prevents any lateral shifting of the device. The width of the plate 12 is such that sufficient clearance is permitted through the opening 8 to permit the mechanic to then direct his entire attention to the splicing of the electrical wires. Heretofore it has been necessary that the mechanic support the fixture bodily while making the necessary connections with the wiring in the box. The device greatly facilitates the installation of fixtures of all types that is supported by outlet boxes. In certain types of outlet boxes, such for instance as the well known rectangular box, is provided with tongues 10 at opposite ends and with the box having no supporting lip such as that illustrated in this application. In such case, the tongues are engaged within the recesses 15 while the tongues 17 are swung into overlying relation with the tongues of the box, thus securely holding the supporting plate against movement either inwardly or outwardly and since the tongues lie wholly within the recesses, no lateral motion can be possible.

It will be apparent from the foregoing that an extremely simple and highly effective fixture support has been provided. The device results in a very considerable saving in labor and provides for an exceptionally strong support for the fixture that is considerably stronger than devices heretofore employed in such supports. The device is stamped in an economic manner and it will be apparent, that the device will be formed in varying lengths in accordance with the various types of outlet boxes commonly employed in the electrical industry. The device is easily dismounted, should it be necessary to remove the fixture, requiring only that the operator loosen the screws 16, and swing the tongue 17 away from the tongues 10, such as that illustrated in Figure 4 at which time, the plate 12 and its attached fixture may be tilted upwardly to disengage its opposite end from its supporting lip or tongue 10 and then shifted outwardly and downwardly, it being understood of course that prior to the removal of the fixture, the wire splicing will be broken.

It is to be understood that the invention is not limited to the precise construction shown, but that changes are contemplated as readily fall within the spirit of the invention as shall be determined by the scope of the subjoined claim.

Having described my invention, what I claim as new and desire to secure by Letters Patent is:

The combination with a cover plate of an outlet box, said cover plate having a flange extending outwardly and axially of the outlet box and forming a main opening leading into the outlet box, said flange being provided adjacent to its outer end with an inwardly extending annular lip, said annular lip being provided with a pair of tongues which extend radially inwardly beyond the annular lip, said tongues being relatively short with respect to the annular dimension of said lip and said tongues being spaced and diametrically oppositely arranged, a single layer relatively narrow plate having an opening near its longitudinal center for receiving a fixture, said relatively narrow plate having oppositely arranged parallel edges which are spaced from the annular lip throughout the major portion of the annular dimension of said lip, said relatively narrow plate being provided at its outer ends with shoulders arranged at a right angle to the face of said plate, said plate extending outwardly and longitudinally beyond the shoulders to provide flange extensions, said shoulders having their intermediate portions extended inwardly of said plate to provide generally U-shaped recesses which are spaced from the longitudinal edges of said plate, said recesses having corresponding sides covered by said flange extensions of said plate and their opposite sides open, the outer edges of the recesses being open, said recesses being adapted to receive said tongues when the flange extensions are arranged over said tongues, said tongues holding said plate against turning movement when said tongues are arranged within said recesses and the tongue extensions engaging above said tongues, and second tongues pivotally mounted upon the face of said plate which face is remote from the tongue extensions, said second tongues being adapted to be moved to positions extending across the recesses for holding the tongues within the recesses.

References Cited in the file of this patent
UNITED STATES PATENTS

| 247,225 | Sullivan | Sept. 20, 1881 |
| 1,286,320 | Hood | Dec. 3, 1918 |
| 1,724,538 | Weichelt et al. | Aug. 13, 1929 |
| 1,835,728 | Urfer | Dec. 8, 1931 |
| 1,839,250 | Newman et al. | Jan. 5, 1932 |

FOREIGN PATENTS

| 123,307 | Switzerland | Nov. 16, 1927 |